Feb. 10, 1942.     M. D. SARBEY     2,272,779
FLASH LAMP
Filed Dec. 27, 1939
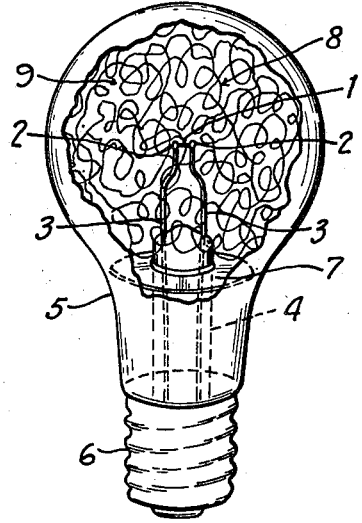
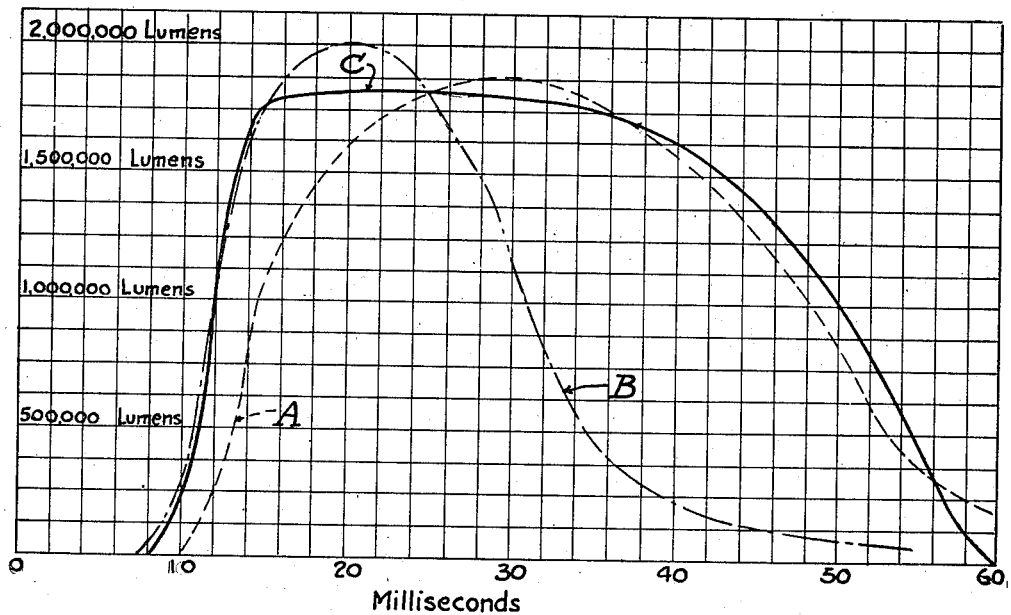
Inventor
Maurice D. Sarbey
By Owens & Owen
Attorneys Patented Feb. 10, 1942

2,272,779

UNITED STATES PATENT OFFICE 2,272,779

FLASH LAMP

Maurice D. Sarbey, Bay Village, Ohio, assignor, by mesne assignments, to Hartford National Bank and Trust Company, Hartford, Conn., as trustee Application December 27, 1939, Serial No. 311,148

5 Claims. (Cl. 67—31)

This invention relates to flash lamps, and more especially to novel alloys for use as combustible material in such lamps.

The flash lamp commonly used at this time consists of a transparent bulb containing a readily combustible material such as a metal wire or foil, a gas, which is usually oxygen, for supporting the combustion of the said material, and a means, usually electrical, for igniting the said material. When the igniter is energized, the very rapid combustion of the wire or foil gives off a single, very brief, and very intense light. The most important use of flash lamps is to illuminate objects to be photographed. Numerous devices are built, either separately, or as integral parts of a camera, to synchronize the flash of the lamp with the operation of the camera shutter. It is, therefore, highly desirable that flash lamps shall have characteristics suited to this use.

In the making of flash lamps, the most generally useful combustible material is aluminum. However, aluminum is relatively hard to ignite and can be readily ignited only if it is reduced to a form having a very small cross-section. Thus if aluminum is used in the form of foil its thickness usually must not exceed about .00004 inch, while if used in the form of wire its diameter usually must not exceed a few ten thousandths of an inch. However, when it is reduced to such tenuous form its rate of combustion becomes too great to make a good lamp. A study of the variation of light intensity with time in such a lamp shows that the light intensity climbs very rapidly to its maximum value then falls very rapidly again to practically zero. The result is that the major part of the light output of the lamp occurs in a very few milliseconds, usually less than fifteen in certain common types of lamps. When such a lamp is used with a camera, almost its entire light output may be given off either before the shutter opens or after it has closed, in spite of any but the most accurate synchronization, and if a focal plane shutter be used the light may not last during the entire time of sweep of the camera shutter across the plate or film, or may vary in intensity to an objectionable degree during such sweep, irrespective of even perfect synchronization.

For ease of synchronization and the best use with all types of cameras it is, therefore, desirable that a flash lamp shall emit the major portion of its light output rather evenly over a considerable duration of time, say 25 to 30 milliseconds for the most common use. It is also desirable that the intensity of light emission from the lamp shall attain a major portion of its maximum rather promptly after the lamp ignition circuit is closed, say in 12 to 15 milliseconds for most purposes. With pure aluminum these two requirements are to a large extent mutually exclusive, and any wire or foil so thin as to cause the metal to ignite quickly enough, in general burns too rapidly for best results, while heavier wires or foils may have sufficiently long burning period, but if ignited at all, ignite too slowly for best results.

The general object of this invention is, therefore, to provide aluminum alloys for use in flash lamps which so modify the aluminum as to preserve its advantages, and at the same time overcome its shortcomings.

A specific object of the invention is to provide aluminum alloys for use in flash lamps, which are more easily ignitible than aluminum.

Another object is to provide aluminum alloys for use in flash lamps, which, being more easily ignitible than aluminum, may be used as heavier wires or foils, to give both rapid ignition and longer duration of the resulting light flash.

A further object of the invention is to provide aluminum alloys for use in flash lamps which may readily be worked into suitable wires and foils.

Still another object is to provide a flash lamp whose light flash is emitted quickly after the igniter is energized, and rather evenly for a relatively long period thereafter.

Other objects of the invention will be apparent from the following specification.

In the accompanying drawing forming a part of this specification,

Figure 1 is a view of a flash lamp of the kind to which this invention relates, and Fig. 2 is a diagram illustrating the illumination resulting from the use of different combustible materials in such a flash lamp.

The flash lamp shown in Fig. 1 is of a known type except as to the material employed in the combustible wire and the details are illustrated merely to give the setting of the use of the improved combustible material and, of course, may be varied as desired without affecting the invention.

In the construction shown, there is a filament 1 upon which there are beads 2 of igniter material which may be of powdered zirconium or other similarly ignitible material. The filament is shown attached to lead wires 3—3 which are mounted on a glass stem 4 within the transparent bulb 5, the bulb having a base 6 adapted to screw into a standard socket by which the bulb is connected to a suitable source of electricity. Preferably there is an asbestos disk 7 about the tube 4 which prevents the ignitible wire 8 from entering the neck of the bulb. The space 9 about the wire contains oxygen.

It will be readily understood that when subjected to an electric current, the filament 1 becomes heated and ignites the beads 2 which in turn ignite the wire 8, the burning of which emits the desired light. The present invention relates to the material employed in forming the combustible wire 8.

The preferred alloy for wire 8 consists predominantly of aluminum with minor additions of one or more of the metals of the group consisting of zirconium, barium, strontium, cerium, and misch-metal. The addition to aluminum of more than .5% of the alloying metals improves the result, and as much as 1% of the alloying metals produces a marked increase in the ignitibility of the resulting alloy when worked into fine wire or foil, as compared with aluminum. For most purposes, however, about 1% to 5% of the alloying metal and the balance aluminum produces a very satisfactory alloy. As the addition of the alloying metals exceeds 5% the alloys become more difficult to work. With careful working, small percentages of reduction at each pass through the rolls, swagers, wire drawing dies, or other mechanical working equipment, and frequent intermediate annealings, alloys containing up to 15% of the alloying elements can be worked.

In the diagram constituting Fig. 2, there are indicated the performance curves of bulbs of the kind described above with combustible wires of three different compositions or sizes. In the diagram, the ordinates show the approximate radiation in lumens, while the abscissas show time in milliseconds.

Curve A shows the perforance of a lamp in which wire 8 consists of a substantially pure aluminum wire .001 inch in diameter. Curve B shows the performance of a flash lamp wherein the wire 8 consists of a substantially pure aluminum wire about .0006 inch in diameter. Curve C shows the performance of a lamp wherein the wire 8 is .001 inch in diameter and consists of an alloy containing 3.1% misch-metal, the balance being substantially all aluminum.

It will be noted that curve A indicates somewhat slower ignition than the other curves and after the wire begins to burn, there is a noticeably slower increase in illumination. For most purposes for which flash lamps of this type are employed, a radiation of 1,500,000 lumens may be considered satisfactorily effective. Taking this point for comparison, it will be seen that after making electrical contact, which time is indicated by the point zero, nearly 20 milliseconds elapse before the illumination by wire 8 reaches 1,500,000 lumens. After this point is reached the illumination gradually increases and then decreases until it drops below 1,500,000 lumens at about 41 milliseconds after the closing of the circuit.

In order to obtain a more prompt production of light, a smaller wire of the same composition was employed, and it will be seen from curve B that this resulted in a more prompt ignition and the reaching of 1,500,000 lumens in approximately 14 milliseconds. The illumination rapidly increased from this point to a maximum of 2,000,000 lumens and then rapidly decreased, being below 1,500,000 lumens at about 28 milliseconds.

It will be noted that when the improved alloy described in this application was employed for wire 8, the ignition was substantially as prompt, the illumination of 1,500,000 lumens being reached at substantially the same time as in curve B, but slightly sooner if anything, and that the peak illumination was maintained nearly constant for a quite appreciable length of time, dropping to 1,500,000 lumens at about 43 milliseconds.

These performance curves clearly show that while the larger aluminum wire continues to emit as much as 1,500,000 lumens for an appreciable interval, it is somewhat slow in starting, the period from the time of electrical contact until the effective illumination is accomplished being about as long as the period during which the effective illumination lasts.

With the smaller aluminum wire the same proportion holds true. While the ignition is more prompt and working illumination is reached more quickly, it also lasts a shorter time and terminates much more quickly. With the alloy described in this application, the illumination begins as promptly as with the small aluminum wire and continues even beyond that of the aluminum wire of the same size.

Incidentally it may be pointed out that with the type of alloy disclosed in this application, the illumination not only starts promptly and lasts during the effective range for a considerable time, but also the combustion of the wire both before and after effective degree of illumination results is comparatively short, whereas with the aluminum wire, the combustion before effective illumination is reached is somewhat longer, and after effective illumination ceases, combustion tails out for a considerable time. This shows graphically the greater efficiency of the alloy disclosed in this application, since most of its illumination takes place through the effective range.

Another important feature, especially where a camera of the focal plane type is employed is the nature of the curve during the effective illumination period. If instead of 1,500,000 lumens being taken as the point of comparison, we take 1,700,000, or slightly below half way between the 1,500,000 and the 2,000,000 lumens, it will be seen that the curves B and C each reach this point at slightly before 13 milliseconds, but while curve B drops below this point at about 25 milliseconds curve C continues at about this degree of radiation until about 36 milliseconds. Curve A does not reach this point until about 23 milliseconds. Curve C also drops below this point at about 36 milliseconds. Therefore, the illumination period of curve C at 1,700,000 lumens is even longer in comparison with the other curves than at the lower range. Also, it will be seen that even during the short period when curves A and B are above 1,700,000 lumens their illumination varies much more rapidly than with curve C. As a matter of fact, the variation in illumination in curve C is no greater at the top of the curve for 23 milliseconds than it is for about 4 milliseconds in curve B or 8 milliseconds in curve A.

While curve C is as described for one specific alloy, it will be readily understood that other alloys coming within the range of this specification show an effect varying from pure aluminum in the same direction as curve C varies from curve A or B, although the degree of such variation will be affected by the exact materials employed and their proportions. Thus a specific alloy containing 1.37% strontium, and the balance substantially aluminum, showed an ignitibility about equal to that of the misch-metal alloy, but not so long or even a burning period. A similar barium alloy is slightly inferior to strontium, and an alloy with about 5% zirconium is slightly inferior to barium. All of these alloys, however, are considerably superior to pure aluminum, and their curves, if shown on Fig. 2, would occupy positions intermediate between curves A and C.

The alloying elements above mentioned are highly and readily oxidizable materials, but not all such materials may be used. Thus calcium and lithium when added to aluminum even in very small percentages, produce alloys that are so difficult to work into fine wires or foils as to be useless for practical purposes. Beryllium on the other hand produces workable alloys with aluminum, but does not materially improve its ignitibility.

In the making of the alloys of the present invention the aluminum is melted first, in any suitable furnace, and brought to a temperature of about 800° C. The alloying element or elements are then dissolved in it. Alloys of barium and strontium may be made by adding the pure metal, plunging it below the surface of the aluminum by means of a perforated iron cup, where it quickly dissolves, but produces considerable oxidation and slagging of the alloying material and a major portion of it may be lost. Another method is to maintain an atmosphere of helium or other inert gas in the crucible, which reduces the loss of strontium or barium by oxidation. Still another method is to generate the metal in place by adding to the melted aluminum briquettes of a mixture of powdered aluminum with barium oxide or strontium oxide. This requires higher temperatures.

In the case of zirconium, this metal is commercially available as an aluminum alloy of relatively high zirconium content. The desired alloy is, therefore, most easily made by adding this zirconium rich-alloy to a calculated amount of aluminum.

In the case of cerium and misch-metal, the metal is merely added to the melted aluminum, and because of its high density it immediately sinks and then dissolves slowly with some oxidation. Maintaining the temperature and stirring occasionally until solution is complete finishes the process.

Misch-metal is the commercial name given to the naturally occurring mixture of the rare earth metals. These metals occur together in their ore (usually monazite sand) in fairly definite proportions. They are difficult to separate from each other and are, therefore, commonly reduced as a group. This group usually contains about 50% cerium, 20% lanthanum, the balance being divided among the other rare earth metals of the group. Cerium is difficult to make and is not available commercially. Misch-metal on the other hand is relatively inexpensive and is made commercially in considerable quantity for use in pyrophoric alloys. For this reason, and because it makes a more workable alloy with aluminum than does pure cerium, it is preferred to pure cerium itself for the purposes of this invention.

After the alloys have been made, they are cast into the form of rods or ingots which can be rolled or swaged, and then drawn into fine wires. The mechanical working can all be done cold, with occasional annealings as the metal becomes work hardened.

In the making of flash lamps it is now recognized tht wire is usually preferable to foil, both because of the superior time-character of the flash produced by wire lamps, and because wires are easier to make and to handle. The alloys of the present invention are particularly suitable for making wire. In the common flash lamp wire of a diameter of about .001 inch is usually required. Because of the limited tensile strength of many aluminum alloys, wires of this small size are too difficult, if not impossible, to draw directly. For greater convenience and economy the alloys of the present invention are, therefore, worked into rods of about ¼ inch diameter, which are then snugly fitted into copper tubes. These filled tubes are then worked into wires by the usual commercial methods used with copper, and with scarcely any more care or difficulty than is required for pure copper. In this way the copper furnishes the strength and support required to pull the aluminum alloy through the dies. When the filled tubes have been drawn down until the aluminum alloy core is of the desired size, the copper is dissolved off with a suitable differential solvent that attacks copper but not aluminum, such as nitric acid for instance, or the copper can be removed by deplating.

In the making of wire filled flash lamps, it is often desirable that the wire shall have a certain stiffness, or springiness. This makes for greater ease in handling and prevents it from matting together.

In certain compositions of the alloys of the present invention, especially those in which the percentage of the alloying element is very low, the natural springiness of the wire may be insufficient for some purposes. In such cases it may be increased by adding a minor percentage of any one of a number of metals which are known to have a hardening effect on aluminum. Many such hardening agents are known in the metallurgy of aluminum, and among them are copper, silver, iron, nickel, cobalt, etc. The amount of hardening agent depends on the one used, but it is usually from a fraction of one percent to not over two percent.

What I claim is:

1. In a flash lamp a combustible element in the form of a long thin body, said element consisting of an alloy comprising .5% to 15% of a metal from the group consisting of zirconium, barium, strontium, cerium and misch-metal and the balance of said alloy being substantially all aluminum.

2. In a flash lamp a combustible element in the form of a wire, said element consisting of an alloy comprising .5% to 15% of a metal from the group consisting of zirconium, barium, strontium, cerium and misch-metal, not over 2% of a metal having a hardening effect on aluminum and the balance of the alloy being substantially all aluminum.

3. In a flash lamp comprising a transparent bulb, a wire within the bulb of an alloy of aluminum with from .5% to 15% of a metal of the group consisting of zirconium, barium, strontium, cerium and misch-metal and with from a fraction of one percent to not over 2% of a metal having a hardening effect upon aluminum, oxygen within the bulb, and means to ignite the wire.

4. In a flash lamp comprising a bulb, a combustible element in the form of a wire within the bulb, said element consisting of an alloy of aluminum with from 1% to 5% of a metal of the group consisting of zirconium, barium, strontium, cerium, and misch-metal and with not over 2% of a metal having a hardening effect upon aluminum, oxygen within the bulb and means to ignite the wire element.

5. In a flash lamp a combustible element in the form of a long thin body, said element consisting of an alloy comprising 1% to 5% of a metal from the group consisting of zirconium, barium, strontium, cerium and misch-metal and the balance of said alloy being substantially all aluminum.

MAURICE D. SARBEY.